No. 849,933. PATENTED APR. 9, 1907.
C. A. TAYLOR.
BALL COCK VALVE.
APPLICATION FILED DEC. 6, 1905.
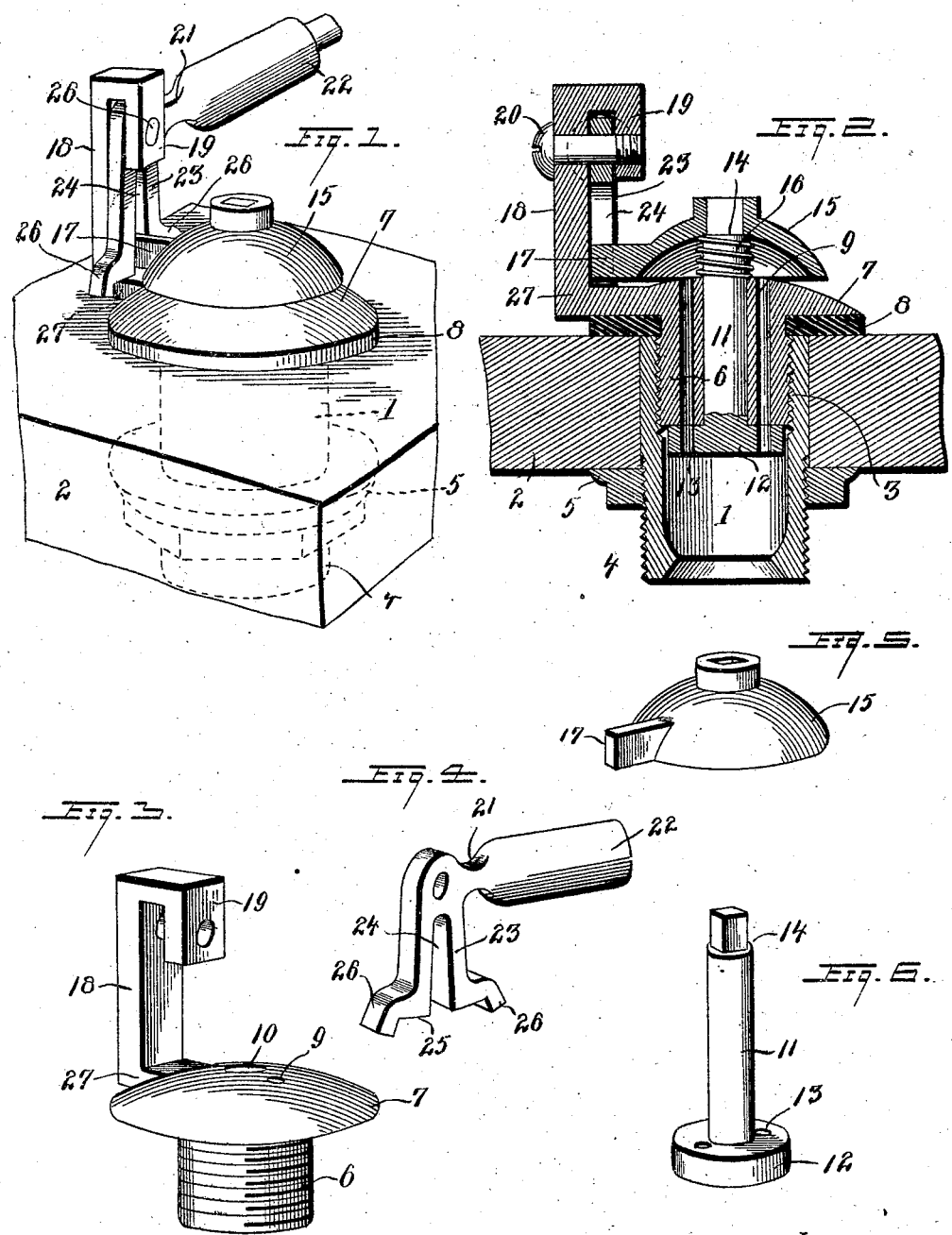
INVENTOR
Charles A. Taylor
WITNESSES:
By E. B. Stocking
Attorney

UNITED STATES PATENT OFFICE.

CHARLES A. TAYLOR, OF MADISON, MAINE, ASSIGNOR OF ONE-HALF TO JOHN W. HANNAGAN, OF MADISON, MAINE.

BALL-COCK VALVE.

No. 849,933.          Specification of Letters Patent.          Patented April 9, 1907.

Application filed December 6, 1905. Serial No. 290,595.

*To all whom it may concern:*

Be it known that I, CHARLES A. TAYLOR, a citizen of the United States, residing at Madison, in the county of Somerset, State of Maine, have invented certain new and useful Improvements in Ball-Cock Valves, of which the following is a specification, reference being had therein to the accompanying drawings.

This invention relates to a ball-cock valve, and particularly to a float-controlled construction adapted for application to cisterns or tanks.

The invention has for an object to provide an improved construction and arrangement of parts by which more efficient results are secured in the connection between the float-lever and the valve controlled thereby, so as to secure a positive operation with a minimum of friction and effect a tight joint between the valve-casing and the cistern or tank to which it is applied.

Other and further objects and advantages of the invention will be hereinafter fully set forth and particularly defined by the appended claims.

In the drawings, Figure 1 is a perspective of the invention. Fig. 2 is a central vertical section. Fig. 3 is a detail perspective of the valve-casing. Fig. 4 is a similar view of the crank-lever. Fig. 5 is a detail perspective of the valve-head, and Fig. 6 is a similar view of the valve.

Like numerals of reference indicate like parts throughout the several views of the drawings.

The numeral 1 designates a sleeve or connection adapted for insertion in the lower part of a tank or cistern 2 and interiorly threaded at its upper portion, as shown at 3. The lower portion of the sleeve is exteriorly threaded, as at 4, and a clamping-nut 5 may be applied thereto in the usual manner. Cooperating with the threaded portion 3 is a valve casing or seat 6, exteriorly threaded to engage with the sleeve, and provided with an enlarged cap 7, beneath which a washer 8, of any desired material, may be disposed, so that when the valve-seat is screwed into the sleeve the washer is compressed and an absolutely tight joint effected between the cistern or tank and the sleeve inserted therein. The valve-casing is provided with one or more passages 9 therethrough and with a central opening 10, through which the stem 11 of valve 12 extends. This valve is provided with passages 13 therethrough, adapted to be brought into alinement with the passages 9 in the rotation of the valve. The valve-stem is provided with a seat 14 at its upper portion, upon which a head 15 rests and is secured, while interposed between the head and the top of the casing is a coil-spring 16 by which the valve is normally held in close contact with its seat.

The head 15 may, as shown, be formed concave, so that the liquid passing through the valve will strike the same and be deflected toward the bottom of the cistern, thus avoiding any spurting of the liquid or pipe connection at that point. The head 15 is provided at one side with a radially-extending lug 17, constituting a lever from the valve 12, by which the latter may be rotated. The cap of the valve-casing is likewise provided at one side with a bracket 18, having a depending lug 19, through which a pivot 20 is adapted to pass for the purpose of pivotally mounting the crank-lever 21 in said bracket. One arm, 22, of this lever is adapted to receive the usual float and rod for the purpose of actuating the valve, while the other arm, 23, is slotted longitudinally, as shown at 24, and adapted to receive in said slot the lug 17 of the valve-head. The under face of the arm 23 is properly curved to provide for a free travel thereof and formed at opposite ends with stops 26, adapted to engage the base 27 of the bracket 18 in order to limit the movement of the crank-lever in opposite directions.

In the operation of the invention the rising and falling of the float oscillates the crank-lever, which, by reason of the slotted connection with the valve-head, rotates the valve for the purpose of admitting or cutting off the flow of liquid to the tank. This slotted connection provides a simple and efficient construction for shifting the valve and avoids the friction of a geared connection, and provides a positive connection adapted to be limited in its travel for effectually controlling the rotary valve. The construction of this valve is such that no leather or rubber parts are involved, and the contact of the metallic surfaces with each other is such as to effect a tight joint, even though the faces should wear.

The construction of the valve-casing and the manner of mounting the same on the sleeve provides a tight joint between the several parts and the cistern or tank to which they are applied.

Having now described my invention and set forth its merits, what I claim, and desire to secure by Letters Patent, is—

1. The combination with a valve-casing, of a pivoted valve mounted therein and capable of a reciprocatory movement in the direction of its axis of rotation, said valve having a lever-arm extended in a direction transverse to its axis of rotation, a pivotal operating-lever whose axis of rotation is transverse to the direction of said reciprocatory movement having an arm slotted in a direction transverse to its axis of rotation, the slot in said arm engaging the lever-arm on said valve to move it about its pivot and lying in one position in the path of said lever-arm in the reciprocatory movement of the valve.

2. The combination with a valve-casing, of a rotary valve mounted therein for reciprocative movement and having a laterally-disposed lever, a bracket vertically disposed at one side of said casing and having a stop portion at its base, an angle-lever mounted in said bracket and provided with a float-arm and a depending longitudinally-slotted arm to embrace said valve-lever, and stops carried by said slotted arm at opposite sides of the base to engage the stop portion thereof.

3. A valve comprising a casing, a rotary valve mounted therein and provided with a lever extending therefrom, a bracket, a crank-lever mounted in said bracket and provided with a slotted depending arm to receive said valve-lever, and stops disposed upon said arm at opposite sides of the slot therein to engage a portion of said bracket.

4. A valve comprising a valve-casing having a passage therethrough, a rotary valve provided with an apertured face in contact with the inner face of said casing, a valve-stem extended through said casing, a valve-head secured to said stem and provided with a concave under face above the passage in the valve-casing, a tension-spring disposed between said head and casing to retain the apertured face in contact, and means for oscillating the parts of said valve.

In testimony whereof I affix my signature in presence of two witnesses.

CHARLES A. TAYLOR.

Witnesses:
C. O. SMALL,
S. E. REMICH.